(12) United States Patent
Banach et al.

(10) Patent No.: US 6,252,013 B1
(45) Date of Patent: Jun. 26, 2001

(54) METHOD FOR MAKING SILOXANE COPOLYCARBONATES

(75) Inventors: Timothy Edward Banach, Scotia; Gary Charles Davis, Albany; Paul Michael Smigelski, Jr., Schenectady; Patrick Joseph McCloskey, Watervliet, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/483,959

(22) Filed: Jan. 18, 2000

(51) Int. Cl.$^7$ ...................................................... C08F 4/46
(52) U.S. Cl. .................... 525/464; 524/706; 524/711; 524/745; 524/777; 524/537; 524/588; 528/26; 528/371
(58) Field of Search .............................. 525/464; 528/371, 528/26, 23; 524/706, 711, 745, 759, 777, 537, 588

(56) References Cited

U.S. PATENT DOCUMENTS

| | | |
|---|---|---|
| 4,994,532 | 2/1991 | Hawkins et al. . |
| 5,227,449 | 7/1993 | Odell et al. . |
| 5,357,022 | 10/1994 | Banach et al. . |
| 5,504,177 | 4/1996 | King, Jr. et al. . |
| 5,530,083 | 6/1996 | Phelps et al. . |
| 5,783,651 | 7/1998 | Konig et al. . |
| 6,184,334 | 2/2001 | McCloskey et al. . |

FOREIGN PATENT DOCUMENTS

| | | |
|---|---|---|
| 673959A1 | 2/1995 | (EP) . |
| 0864599 | 9/1998 | (EP) . |

OTHER PUBLICATIONS

"Catalyst For Purification of Exhuast Gas"–Japanese Abstract 09324225.

*Primary Examiner*—Robert Dawson
*Assistant Examiner*—Marc S. Zimmer
(74) *Attorney, Agent, or Firm*—Bernadette M. Bennett; Donald S. Ingraham

(57) ABSTRACT

A melt condensation polymerization process for preparing siloxane copolycarbonates is provided. The process includes reacting an aromatic dihydroxy compound, carbonic acid diester, hydroxyaryl terminated polydiorganosiloxane and catalyst with a salt.

20 Claims, No Drawings

METHOD FOR MAKING SILOXANE COPOLYCARBONATES

BACKGROUND OF THE INVENTION

The present invention relates to a method for making siloxane copolycarbonates. More particularly, the present invention relates to a melt condensation polymerization method for making siloxane copolycarbonates.

Siloxane copolycarbonates and methods for their production have been studied extensively throughout the years. Siloxane copolycarbonates are well known thermoplastic resins which have good flow and mold release characteristics in injection molding applications. The synthetic method commonly used to make siloxane copolycarbonates is an interfacial phosgenation process.

The interfacial phosgenation process, as described by Phelps et al. in U.S. Pat. No. 5,530,083, involves reacting an aromatic dihydroxy compound, phosgene and catalyst with a hydroxyaryl terminated diorganopolysiloxane. This method successfully integrates siloxane monomers into copolycarbonates. Unfortunately, the interfacial phosgenation process uses chemically hazardous phosgene and an environmentally hazardous chlorinated solvent.

Melt condensation polymerization is a well known process for the production of polymers such as copolycarbonates. This method has yet to be utilized to produce siloxane copolycarbonates. During the typical melt process, severe decomposition of the siloxane chain occurs via siloxane chain scission followed by siloxane depolymerization to give cyclic siloxanes such as dimethylsiloxane cyclic tetramer ($D_4$). The degradation of the siloxane chain inhibits the production of siloxane copolycarbonates and thus, this method is not utilized to produce siloxane copolycarbonates.

Due to environmental concerns with the interfacial method and the degradation of the siloxane chain with the melt condensation polymerization method, new methods of synthesizing siloxane copolycarbonates are constantly being sought.

BRIEF SUMMARY OF THE INVENTION

This invention provides a melt polymerization method for preparing a siloxane copolycarbonate comprising the reaction of an aromatic dihydroxy compound, carbonic acid diester, hydroxyaryl terminated polydiorganosiloxane and catalyst with a salt. The salt in aqueous solution at about 0.1 molar has a pH in a range between about 0 and about 7.

DETAILED DESCRIPTION OF THE INVENTION

It has been found that the melt condensation polymerization method can be used in the preparation of siloxane copolycarbonates by use of an acidic or neutral salt. Without the presence of an acidic or neutral salt, the siloxane chain of the hydroxyaryl terminated polydiorganosiloxane typically decomposes. In addition, the siloxane chain of the hydroxyaryl terminated polydiorganosiloxane depolymerizes to produce cyclic silicones. The addition of the salt effectively keeps the siloxane chain intact and a siloxane polycarbonate is successfully prepared.

Salts typically used with the present invention include, but are not limited to, salts of halo-acids as well as salts of non-volatile acids. Salts of halo-acids are an alkali or alkali earth metal salt of hydrochloric acid, hydrobromic acid, or hydroiodic acid. Salts of non-volatile acids are alkali or alkali earth metal salts of phosphorus acid, phosphoric acid, sulfur acid, and lower oxo-acid salts of sulfur acids such as sulfite acid. Salts of non-volatile acids include phosphate salts, phosphite salts, sulfate salts, sulfite salts, and salts of chelating type carboxylic acids such as EDTA. Typical salts used are phosphate salts, cesium salts, sodium salts, halide salts and combinations thereof. The salt in aqueous solution at about 0.1 molar has a pH in a range between about 0 and about 7. Preferably, the salt in aqueous solution at about 0.1 molar has a pH in the range between about 5 and about 6.

Typical catalysts employed in the melt condensation polymerization process include, but are not limited to, alkali metal compounds, alkaline earth metal compounds, quaternary ammonium compounds and combinations thereof.

Useful alkali metal compounds as catalysts include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenolate, sodium benzoate, potassium benzoate, lithium benzoate, disodium hydrogenphosphate, dipotassium hydrogenphosphate, dilithium hydrogenphosphate, disodium, dipotassium and dilithium salts of biphenol A and sodium, potassium, and lithium salts of phenol.

Useful alkaline earth metal compounds as catalysts include calcium hydroxide, barium hydroxide, magnesium hydroxide, strontium hydroxide, calcium hydrogen carbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

Useful quaternary ammonium compounds as catalysts include tetraalkylammonium compounds such as tetramethylammonium hydroxide and tetraethylammonium hydroxide.

Preferred catalysts include tetramethylammonium hydroxide, sodium hydroxide and mixtures thereof.

The salts are typically added in the beginning stages of the melt condensation polymerization process. Most typically, the salts are added before the temperature of the reactor reaches about 100° C. due to the degradation of the siloxane chains above this temperature. The salts can be added in any convenient forms, such as in the form of a solution or in the form of a solid.

Carbonic acid diesters are of the general formula, $R_2(CO_3)$ wherein R is an alkyl or aryl group. Typical examples of carbonic acid diesters include, but are not limited to, diphenyl carbonate, ditolyl carbonate, bis (chlorophenyl) carbonate, m-cresyl carbonate, dinaphthyl carbonate, diethyl carbonate, dimethyl carbonate, dibutyl carbonate, dicyclohexyl carbonate and combinations thereof. The carbonic acid diester most typically used is diphenyl carbonate.

Some of the hydroxyaryl terminated polydiorganosiloxanes which can be used in the practice of the invention, are phenol-siloxanes included within formula I,

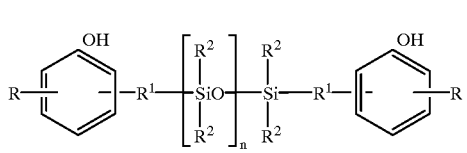

(I)

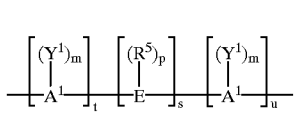

(IV)

where R is selected from hydrogen, and wherein each R is independently the same or different radical selected from halogen, $C_{(1-8)}$ alkoxy, $C_{(1-8)}$ alkyl and $C_{(6-13)}$ aryl, $R^1$ is a $C_{(2-8)}$ divalent aliphatic radical, $R^2$ is independently selected from the same or different $C_{(1-13)}$ monovalent organic radicals, and n is an integer in a range between about 1 and about 100 inclusive and has an average value in a range between about 10 and about 100 inclusive. Preferably, n has a value in a range between about 5 and about 75, and more typically, n has a value in a range between about 10 and about 60.

The hydroxyaryl terminated polydiorganosiloxane can be made by effecting a platinum catalyzed addition between a siloxane hydride of formula II,

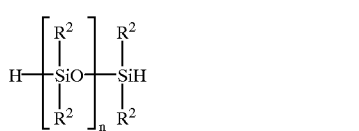

(II)

and an aliphatically unsaturated monohydric phenol where $R^2$ and n are as previously defined. Examples of a similar procedure is disclosed in U.S. Pat. No. 5,357,022 and U.S. Pat. No. 5.530,083.

Some of the radicals included within R in the formula I are halogen radicals, such as bromo, and chloro; alkyl radicals such as methyl, ethyl and propyl; alkoxy radicals such as methoxy, ethoxy and propoxy; aryl radicals such as phenyl, chlorophenyl, and tolyl. Radicals included within $R^1$ are, for example, dimethylene, trimethylene, and tetramethylene. Radicals included within $R^2$ are, for example, $C_{(1-8)}$ alkyl radicals, haloalkyl radicals such as trifluoropropyl and cyanoalkyl radicals; and aryl radicals such as phenyl, chlorophenyl and tolyl. $R^2$ is preferably methyl, or a mixture of methyl and trifluoropropyl, or a mixture of methyl and phenyl.

Some of the aliphatically unsaturated monohydric phenols, which can be used to make the hydroxyaryl terminated polydiorganosiloxanes are, for example, eugenol, 2-allylphenol, 4-allyl-2-methylphenol, 4-allyl-2-phenylphenol, 4-allyl-2-bromophenol, 4-allyl-2-t-butoxyphenol, 2-methyl-4-propargylphenol, 2-allyl-4-bromo-6-methylphenol, 2-allyl-6-methoxy-4-methylphenol, 2-allyl-4,6-dimethylphenol, 4-vinylphenol, and p-isoprophenylphenol.

Suitable aromatic dihydroxy compounds for preparing siloxane copolycarbonates include those represented by the formula III:

HO—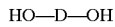—OH (III)

wherein D is a divalent aromatic radical. Preferably, D has the structure of formula IV;

wherein $A^1$ represents an aromatic group such as phenylene, biphenylene, and naphthylene. E may be an alkylene or alkylidene group such as methylene, ethylene, ethylidene, propylene, propylidene, isopropylidene, butylene, butylidene, isobutylidene, amylene, amylidene, and isoamylidene. When E is an alkylene or alkylidene group, it may also consist of two or more alkylene or alkylidene groups connected by a moiety different from alkylene or alkylidene, such as an aromatic linkage; a tertiary amino linkage; an ether linkage; a carbonyl linkage; a silicon-containing linkage such as silane or siloxy; a sulfur-containing linkage such as sulfide, sulfoxide, or sulfone; or a phosphorus-containing linkage such as phosphinyl or phosphonyl. In addition, E may be a cycloaliphatic group, such as cyclopentylidene, cyclohexylidene, 3,3,5-trimethylcyclohexylidene, methylcyclo-hexylidene, 2-[2.2.1]-bicycloheptylidene, neopentylidene, cyclopentadecylidene, cyclododecylidene, and adamantylidene. $R^5$ represents hydrogen or a monovalent hydrocarbon group such as alkyl radicals, aryl radicals, aralkyl radicals, alkaryl radicals, cycloalkyl radicals, or bicycloalkyl radicals. The term "alkyl radical" is intended to designate both normal alkyl and branched alkyl radicals. Normal and branched alkyl radicals are preferably those containing in a range between about 2 and about 20 carbon atoms, and include as illustrative non-limiting examples ethyl, propyl, isopropyl, butyl, tertiary-butyl, pentyl, neopentyl, hexyl, octyl, decyl, dodecyl. Aryl radicals include examples such as phenyl and tolyl. Cyclo- or bicycloalkyl radicals represented are preferably those containing in a range between about 3 and about 12 ring carbon atoms with a total of carbon atoms less than or equal about 50. Some illustrative non-limiting examples of these cycloalkyl radicals include cyclobutyl, cyclopentyl, cyclohexyl, methylcyclohexyl, and cycloheptyl. Preferred aralkyl radicals are those containing in a range between about 7 and about 14 carbon atoms; these include, but are not limited to, benzyl, phenylbutyl, phenylpropyl, and phenylethyl.

$Y^1$ may be a halogen, such as fluorine, bromine, chlorine, and iodine; a tertiary nitrogen group such as dimethylamino; an organic group such as $R^5$ above, or an alkoxy group such as OR wherein R is an alkyl or aryl group; it being only necessary that $Y^1$ be inert to and unaffected by the reactants and reaction conditions used to prepare the polyester carbonate. The letter "m" represents any integer from and including zero through the number of positions on $A^1$ available for substitution; "p" represents an integer from and including zero through the number of positions on E available for substitution; "t" represents an integer equal to at least one; "s" is either zero or one; and "u" represents any integer including zero.

In the aromatic dihydroxy phenol compound in which D is represented by formula III above, when more than one $Y^1$ substituent is present, $Y^1$ may be the same or different. For example, the $Y^1$ substituent may be a combination of different halogens. The $R^5$ substituent may also be the same or different if more than one $R^5$ substituent is present. Where "s" is zero in formula IV and "u" is not zero, the aromatic rings are directly joined. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups.

Some illustrative, non-limiting examples of aromatic dihydroxy compounds of formula III include the dihydroxy-substituted aromatic hydrocarbons disclosed by genus or species in U.S. Pat. 4,217,438. Some preferred examples of aromatic dihydroxy phenols include 4,4'-(3,3,5-trimethylcyclohexylidene)diphenol; 2,2-bis(4-hydroxyphenyl)propane (commonly known as bisphenol A); 2,2-bis(4-hydroxy-3,5-dimethylphenyl)propane; 2,4'-dihyroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(3-phenyl-4-hydroxyphenyl)-propane; bis(4-hydroxyphenyl) cyclohexylmethane; 2,2-bis(4-hydroxyphenyl)-1-phenylpropane; 2,2,2',2'-tetrahydro-3,3,3',3'-tetramethyl-1,1-spirobi[1H-indene]-6,6'-diol (SBI); resorcinol; and $C_{1-3}$alkyl-substituted resorcinols.

Most typically, 2,2-bis(4-hydroxyphenyl)propane is the preferred aromatic dihydroxy compound used. Combinations of aromatic dihydroxy compounds also can be used.

In order to form the siloxane copolycarbonates, one mole of the carbonic acid diester is needed for each mole of aromatic dihydroxy compound. Catalyst is present in a range between about $10^{-5}$ moles and about $10^{-3}$ moles to moles of aromatic dihydroxy compound. In another embodiment, the catalyst is present in a range between about $10^{-7}$ moles and about $10^{-5}$ moles to moles of aromatic dihydroxy compound. The hydroxyaryl terminated polydiorganosiloxane is present in a range between about 0.1 weight percent and about 40 weight percent of the siloxane copolycarbonate.

The reactants for the melt condensation polymerization process are heated to a temperature in a range between about 180° C. and about 330° C. and more preferably, in a range between about 200° C. and about 300° C. The reaction vessel is typically purged of oxygen and filled with an inert gas such as nitrogen. The reaction vessel typically has a pressure in the range between about 0.5 and about 200 torr. Reaction occurs in batch, continuous or semi-continuous mode. The temperature to pressure ratio changes during the course of the reaction from a low temperature and high pressure to a high temperature and low pressure. The total time of the reaction process is in a range between about 2 and about 7 hours.

The addition of the acidic or neutral salt allows successful production of siloxane copolycarbonates via the melt condensation polymerization method. The addition of the salt effectively prevents the degradation of the siloxane moiety. Due to the highly active nature of the salts, the amount of the catalysts typically used can be substantially decreased by a factor of 100 without a loss of molecular weight of the siloxane copolycarbonate. A high molecular weight polymer has a molecular weight preferably higher than about 20,000.

In order that those skilled in the art will be better able to practice the invention, the following examples are given by way of illustration and not by way of limitation.

EXAMPLE 1

A one inch inside diameter flat-bottomed, glass reactor was charged with 2,2-bis(4-hydroxyphenyl)propane (8.063 grams), diphenyl carbonate (8.054 grams) and a eugenol-stopped siloxane fluid (1.001 grams with a repeat length of 11 such that n is equal to 10 in formula I). Tetramethyl ammonium hydroxide (39.0 microliters of a 2.2 millimolar solution) and cesium sulfate (17.5 microliters of a 1 millimolar solution) were added by pipette. The reactor was fitted with a glass stirrer and high-vacuum bearing, Dean-Stark receiver and a condenser heated at 45° C., which bore a gas-inlet adapter. The flask was evacuated to less than 1 torr and refilled with dry nitrogen gas. The process of evacuating and refilled the reactor was repeated three times. The flask was then heated in a 180° C. salt bath. The material was allowed to melt for 10 minutes, then the bath temperature set point was raised to 210° C. and the material was stirred at 40 rpm. After 26 minutes of stirring, the bath reached 210° C. and the pressure was reduced to 120 torr. During the next 90 minutes, 4.2 milliliters of phenol was distilled off and the pressure was gradually reduced to 95 torr. The bath temperature was raised to 270° C. over the next 20 minutes, whereupon the pressure was reduced to 40 torr. The salt bath was then raised to 300° C. and the pressure reduced to less than 1 torr. This condition was maintained for 65 minutes, at which point the pressure was raised to atmospheric pressure and the material was removed from the reactor.

The resulting siloxane copolycarbonate formed had a $T_g$ of 128° C. as measured by differential scanning calorimetry (DSC), a molecular weight of 151,000 as measured by gel permeation chromatography (GPC) against a polystyrene standard and siloxane degradation was less than 1% as determined by proton nuclear magnetic spectroscopy.

EXAMPLE 2

A one inch inside diameter flat-bottomed, glass reactor was charged with 2,2-bis(4-hydroxyphenyl)propane (5.025 grams), diphenyl carbonate (5.158 grams) and a eugenol-stopped siloxane fluid (1.374 grams with a repeat length of 11 such that n is equal to 10 in formula I). Tetramethyl ammonium hydroxide (25.78 microliters of a 2.2 millimolar solution) and cesium phosphate (11.58 microliters of a 1 millimolar solution) were added by pipette. The reactor was fitted with a glass stirrer and a high-vacuum bearing, Dean-Stark receiver and a condenser heated at 45° C., which bore a gas-inlet adapter. The flask was evacuated to less than 1 torr and refilled with dry nitrogen gas. This process was repeated three time prior to heating the flask in a 180° C. salt bath. The material was allowed to melt for 15 minutes, then the bath temperature set point was raised to 210° C. and the material was stirred at 40 rpm. After 25 minutes of the reaction, the pressure was reduced to 260 torr. After 30 minutes, the bath reached 214° C. and the bath temperature set point was raised to 260° C. and the pressure was reduced to 210 torr. During the next 15 minutes, 3.2 milliliters of phenol was distilled off. The pressure was then gradually reduced to less than 1 torr and the bath was raised to 300° C. over the next 20 minutes. This condition was maintained for 60 minutes, at which point the pressure was raised to atmospheric pressure and the material was removed from the reactor.

The resulting siloxane copolycarbonate formed had a $T_g$ of 118° C. as measured by differential scanning calorimetry (DSC), a molecular weight of 51,500 as measured by gel permeation chromatography (GPC) against a polystyrene standard and analysis by proton nuclear magnetic resonance spectroscopy revealed a siloxane copolycarbonate with little to no degradation of the siloxane moiety in addition to a high molecular weight polymer.

EXAMPLES 3–7

Siloxane copolycarbonates were also made which were 10 weight % siloxane copolymer via the method according to Example 1. Degradation was analyzed via proton nuclear magnetic resonance spectroscopy. The catalysts used were tetramethyl ammonium hydroxide (TMAH) and sodium hydroxide (NaOH). The salt used was cesium sulfate ($Cs_2SO_4$). The amount of catalyst and salt in addition to reaction time were varied to determine the effects on the siloxane copolycarbonate produced in terms of molecular weight and the percent siloxane degradation. Results of the siloxane copolycarbonates produced are seen in Table 1.

TABLE 1

Siloxane Copolycarbonate Copolymers having 10 weight % Siloxane

| TMAH (µL) | NaOH (µL) | $Cs_2SO_4$ (µL) | Reaction Time (min.) | Molecular Weight | % Siloxane Degradation |
|---|---|---|---|---|---|
| 0.039 | 0 | 17.5 | 245 | 151000 | 0 |
| 39 | 17.5 | 0 | 165 | 117000 | 37.2 |
| 0.039 | 17.5 | 0 | 185 | 46400 | 2.5 |
| 39 | 0 | 17.5 | 180 | 81900 | 8.13 |

As indicated by the results in Table 1, employing cesium sulfate instead of sodium hydroxide reduced the amount of degradation. Furthermore, by reducing the tetramethyl ammonium hydroxide by a factor of 100 and employing cesium sulfate, a siloxane copolycarbonate was produced without any detectable degradation.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A melt polymerization method for the preparation of siloxane copolycarbonates which comprises reacting at least one aromatic dihydroxy compound, a carbonic acid diester, a hydroxyaryl terminated polydiorganosiloxane and a catalyst in the presence of a salt wherein the salt in aqueous solution at about 0.1 molar has a pH in the range between about 0 and about 7.

2. The method in accordance with claim 1, wherein the salt in aqueous solution at about 0.1 molar has a pH in the range between about 5 and about 6.

3. The method in accordance with claim 1, wherein the salt comprises salts of halo-acids, salts of non-volatile acids, and combinations thereof.

4. The method in accordance with claim 2, wherein the salt comprises phosphate salts, phosphite salts, cesium salts, sodium salts, halide salts and combinations thereof.

5. The method in accordance with claim 1, wherein the salt comprises cesium sulfate.

6. The method in accordance with claim 1, wherein the aromatic dihydroxy compound comprises 2,2-bis(4-hydroxyphenyl)propane.

7. The method in accordance with claim 1, wherein the carbonic acid diester comprises diphenyl carbonate.

8. The method in accordance with claim 1, wherein the catalyst is an quaternary ammonium compound, alkali metal compound, alkaline earth metal compound or combination thereof.

9. The method in accordance with claim 1, wherein the catalyst comprises tetraalkyl ammonium hydroxide, tetraalkyl phosphonium hydroxide, sodium hydroxide and combinations thereof.

10. The method in accordance with claim 1, wherein the hydroxyaryl terminated polydiorganosiloxane comprises eugenol-terminated polydiorganosiloxane.

11. The method in accordance with claim 1, wherein the reaction occurs at a temperature in a range between about 180° C. and about 330° C.

12. The method in accordance with claim 11, wherein the reaction occurs at a temperature in a range between about 200° C. and about 300° C.

13. The method in accordance with claim 1, wherein the reaction is operated in batch mode.

14. The method in accordance with claim 1, wherein the reaction is operated in continuous mode.

15. The method in accordance with claim 1, wherein the aromatic dihydroxy compound is present in a ratio to carbonic acid diester of about 1:1.

16. The method in accordance with claim 1, wherein the hydroxyaryl terminated polydiorganosiloxane is present in a range between about 0.1 weight percent and about 40 weight percent of the siloxane copolycarbonate.

17. The method in accordance with claim 1, wherein the catalyst is present in a ratio of between about $10^{-8}$ moles and about $10^{-3}$ moles to moles of aromatic dihydroxy compound.

18. The method in accordance with claim 1, wherein the catalyst is present in a ratio of between about $10^{-7}$ moles and about $10^{-5}$ moles to moles of aromatic dihydroxy compound.

19. The method in accordance with claim 1, wherein the reaction occurs at a pressure in a range between about 0.5 torr and about 200 torr.

20. A melt polymerization method for the preparation of siloxane copolycarbonates which comprises reacting 2,2-bis(4-hydroxyphenyl)propane, diphenyl carbonate, a eugenol-terminated polydiorganosiloxane and tetramethylammonium hydroxide in the presence of cesium sulfate.

* * * * *